(12) United States Patent  
Sharifi

(10) Patent No.: US 12,566,076 B2  
(45) Date of Patent: Mar. 3, 2026

(54) AD-HOC NAVIGATION INSTRUCTIONS

(71) Applicant: GOOGLE LLC, Mountain View, CA (US)

(72) Inventor: Matthew Sharifi, Zurich (CH)

(73) Assignee: Google LLC, Mountain View, CA (US)

( * ) Notice: Subject to any disclaimer, the term of this patent is extended or adjusted under 35 U.S.C. 154(b) by 374 days.

(21) Appl. No.: 18/016,732

(22) PCT Filed: Jul. 20, 2022

(86) PCT No.: PCT/US2022/037679  
§ 371 (c)(1),  
(2) Date: Jan. 18, 2023

(87) PCT Pub. No.: WO2024/019710  
PCT Pub. Date: Jan. 25, 2024

(65) Prior Publication Data  
US 2024/0240955 A1     Jul. 18, 2024

(51) Int. Cl.  
*G10L 15/26* (2006.01)  
*G01C 21/36* (2006.01)

(52) U.S. Cl.  
CPC ..... *G01C 21/3608* (2013.01); *G01C 21/3617* (2013.01); *G01C 21/3629* (2013.01)

(58) Field of Classification Search  
USPC ......................................................... 704/275  
See application file for complete search history.

(56) References Cited

U.S. PATENT DOCUMENTS

| | | | | |
|---|---|---|---|---|
| 6,480,121 B1* | 11/2002 | Reimann | .............. | G08G 1/0962 |
| | | | | 340/539.1 |
| 8,498,809 B2 | 7/2013 | Bill | | |
| 8,688,290 B2 | 4/2014 | Jotanotive | | |
| 8,924,218 B2* | 12/2014 | Corpier | ............... | H04L 12/2829 |
| | | | | 704/270.1 |
| 9,317,813 B2 | 4/2016 | McGavran et al. | | |
| 10,802,793 B2* | 10/2020 | Friedman | ........... | G01C 21/3484 |
| 11,954,616 B2* | 4/2024 | Sui | .......................... | G06F 13/42 |
| 2009/0150156 A1 | 6/2009 | Kennewick et al. | | |
| 2013/0166096 A1* | 6/2013 | Jotanovic | ........... | G01C 21/3617 |
| | | | | 701/1 |
| 2017/0059337 A1* | 3/2017 | Barker | ................. | G06Q 10/047 |
| 2017/0356752 A1* | 12/2017 | Lobo | .................. | G01C 21/3415 |

(Continued)

OTHER PUBLICATIONS

International Search Report and Written Opinion for Application No. PCT/US2022/037679, dated Mar. 14, 2023.

*Primary Examiner* — Neeraj Sharma  
(74) *Attorney, Agent, or Firm* — Lerner David LLP

(57) ABSTRACT

A computing device may implement a method for providing navigation information regarding a current trip by a user without the user having previously initiated a navigation session. The method may include receiving a request for navigation information regarding a current trip by a user prior to a user initiating a navigation session, and determining a destination for the current trip. The method may also include generating one or more sets of navigation directions for traveling from a current location of the user to the destination along one or more routes based on a current trajectory of the user, and providing a response to the request for navigation information based on the generated one or more sets of navigation directions.

20 Claims, 8 Drawing Sheets

(56)                     References Cited

U.S. PATENT DOCUMENTS

| | | | |
|---|---|---|---|
| 2018/0322431 A1* | 11/2018 | Folck | G01S 19/51 |
| 2019/0339079 A1* | 11/2019 | Moore | G01C 21/3484 |
| 2020/0333157 A1* | 10/2020 | Moore | H04R 5/04 |
| 2021/0331689 A1* | 10/2021 | Heo | B60K 35/28 |
| 2021/0333900 A1* | 10/2021 | Cho | G06V 40/20 |
| 2024/0318976 A1* | 9/2024 | Eisenmann | G01C 21/3629 |

* cited by examiner

<u>800</u>

START

RECEIVE REQUEST FOR NAVIGATION INFORMATION REGARDING CURRENT TRIP ⎯ 802

DETERMINE DESTINATION FOR CURRENT TRIP ⎯ 804

GENERATE SET(S) OF NAVIGATION DIRECTIONS FOR TRAVELING TO DESTINATION ALONG ROUTE(S) BASED ON CURRENT TRAJECTORY OF USER ⎯ 806

PROVIDE RESPONSE TO REQUEST BASED ON GENERATED SET(S) OF NAVIGATION DIRECTIONS ⎯ 808

END

AD-HOC NAVIGATION INSTRUCTIONS

FIELD OF THE DISCLOSURE

The present disclosure generally relates to navigation systems and, more particularly, to providing responses to ad-hoc requests regarding navigation before the user has initiated a navigation session.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and navigation data for various geographic locations. Software applications executing in computers, smartphones, embedded devices, etc., generate step-by-step navigation directions in response to receiving input from a user, specifying the starting point and the destination. The navigation directions are typically generated for a route which guides the user to the destination in the shortest amount of time.

SUMMARY

In some scenarios such as when a user is familiar with the route from the user's starting location (e.g., their home) to a destination (e.g., their place of work), the user does not request navigation directions and does not initiate a navigation session via a navigation application. However, while the user is on the route the user may have questions about the trip. For example, if there is traffic the user may want to know how much longer it will take before the user arrives at the destination. In another example, the user may want to know whether they should take an alternative route to avoid some of the traffic.

To receive answers to these questions as the user is on a current trip to a destination without having to initiate a navigation session in the middle of the trip, an ad-hoc navigation system may receive a request for navigation information from the user regarding a current trip prior to initiating a navigation session. For example, the request may be, "Hey Maps, I'm on my way to the office. Should I make a left here?" The ad-hoc navigation system may determine the destination based on the information included in the request (e.g., "the office"). In other scenarios, the ad-hoc navigation system may determine the destination based on information included in a previous request, such as a request for navigation directions a few hours before the user began their trip. In yet other scenarios, the ad-hoc navigation system may infer the destination based on user context data, such as calendar events, the user's typical destinations at the particular day of the week/time of day, etc.

Then based on the determined destination and/or the user's current trajectory, the ad-hoc navigation system generates navigation directions from the user's current location to the determined destination for providing a response to the request. For example, if the user is heading east on their current trip, the ad-hoc navigation system may generate navigation directions to the destination that begin with heading east from the current location. In some implementations, the ad-hoc navigation system generates multiple sets of navigation directions for comparison to provide a response to the request. Also in some implementations, the ad-hoc navigation system may use cached navigation directions for example, from a previous request to the destination that overlap with the current trajectory of the user.

The ad-hoc navigation system then analyzes the set(s) of navigation directions using attributes from the request to provide a response to the request. For example, in response to the user's request as to whether they should turn left, the ad-hoc navigation system analyzes the set of navigation directions to the user's office to determine whether the next maneuver in the set is a left turn. Then the ad-hoc navigation system provides a response to the user indicating whether the next maneuver in the set is a left turn. For example, the response may be an audio response confirming that the user is correct and should turn left. The response may also be a text or visual response indicating that the user is correct and should turn left. If the user should not turn left, the response may indicate that the user is incorrect and may ask the user if they would like to receive navigation directions to the destination. Then the ad-hoc navigation system may initiate a navigation session and provide audio and/or visual navigation instructions to the user.

In some scenarios, the ad-hoc navigation system may analyze multiple routes to the user's office to determine which route includes a left turn for the upcoming maneuver. Then the ad-hoc navigation system may provide a response to the user indicating that the next maneuver in one route is a left turn but not in another route. For example, the response may indicate that the next maneuver in the fastest route to the office is to turn left, but if the user prefers the route with the shortest distance the user should continue straight.

By providing responses to requests for navigation information while a user is on a current trip prior to initiating a navigation session, the user does not need to initiate a navigation session at the beginning of a route. This saves battery power on the user's client device, as well as processing power and bandwidth requirements, at least for the portion of the trip where the user does not request navigation information. Additionally, this reduces unnecessary distraction for the user when the user is familiar with most of the route as no unwanted navigation information is provided, and increases driver safety by preventing a driver from having to initiate a navigation session in the middle of a trip if the driver is lost or unsure of the next maneuver, for example. Moreover, the ad-hoc navigation system further reduces bandwidth requirements by caching navigation directions from previous requests and using the cached navigation directions, in some scenarios, to respond a request rather than obtaining the navigation directions from a server.

One example embodiment of the techniques of this disclosure is a method for providing navigation information regarding a current trip by a user without the user having previously initiated a navigation session. The method includes receiving a request for navigation information regarding a current trip by a user prior to a user initiating a navigation session, and determining a destination for the current trip. The method also includes generating one or more sets of navigation directions for traveling from a current location of the user to the destination along one or more routes based on a current trajectory of the user, and providing a response to the request for navigation information based on the generated one or more sets of navigation directions.

Another example embodiment is a computing device for providing navigation information regarding a current trip by a user without the user having previously initiated a navigation session. The computing device includes one or more processors, and a computer-readable memory, which is optionally non-transitory, coupled to the one or more processors and storing instructions thereon that, when executed by the one or more processors, cause the computing device to receive a request for navigation information regarding a current trip by a user prior to a user initiating a navigation session, and determine a destination for the current trip. The instructions also cause the computing device to generate one or more sets of navigation directions for traveling from a current location of the user to the destination along one or more routes based on a current trajectory of the user, and provide a response to the request for navigation information based on the generated one or more sets of navigation directions.

Yet another example embodiment is a computer-readable medium, which is optionally non-transitory, storing instructions for providing navigation information regarding a current trip by a user without the user having previously initiated a navigation session, that when executed by one or more processors cause the one or more processors to: receive a request for navigation information regarding a current trip by a user prior to a user initiating a navigation session, and determine a destination for the current trip. The instructions also cause the one or more processors to generate one or more sets of navigation directions for traveling from a current location of the user to the destination along one or more routes based on a current trajectory of the user, and provide a response to the request for navigation information based on the generated one or more sets of navigation directions.

DETAILED DESCRIPTION

Overview

Generally speaking, the techniques for providing navigation information regarding a current trip by a user without the user having previously initiated a navigation session can be implemented in one or several user computing devices, one or several network servers, or a system that includes a combination of these devices. However, for clarity, the examples below focus primarily on an embodiment in which a user on a current trip provides a request for navigation information to a user computing device. The user computing device analyzes the request for example, using natural language processing techniques, to determine whether a destination is included in the request. The user computing device may also analyze previous requests, and/or user context data, such as calendar events, the user's typical destinations at the particular day of the week/time of day, etc. to determine the destination of the current trip.

The user computing device may also determine the current location and/or the current trajectory of the user computing device, for example, using sensor data from sensors in the user computing device. For example, the current trajectory may indicate that the user is heading East on Highway 101. The user computing device may provide the current location, current trajectory, and/or destination to an external server.

The external server may generate set(s) of navigation directions from the current location to the destination which include(s) the current trajectory. In some implementations, the external server then analyzes the set(s) of navigation directions using attributes from the request to generate a response to the request. The external server may then provide the response to the request to the user computing device. In other implementations, the external server provides the generated set(s) of navigation directions to the user computing device. The user computing device then analyzes the set(s) of navigation directions using attributes from the request to generate a response to the request. Then the user computing device presents the response to the user as an audio response and/or a visual response, via a user interface of the user computing device.

Example Hardware and Software Components

Figure 1:
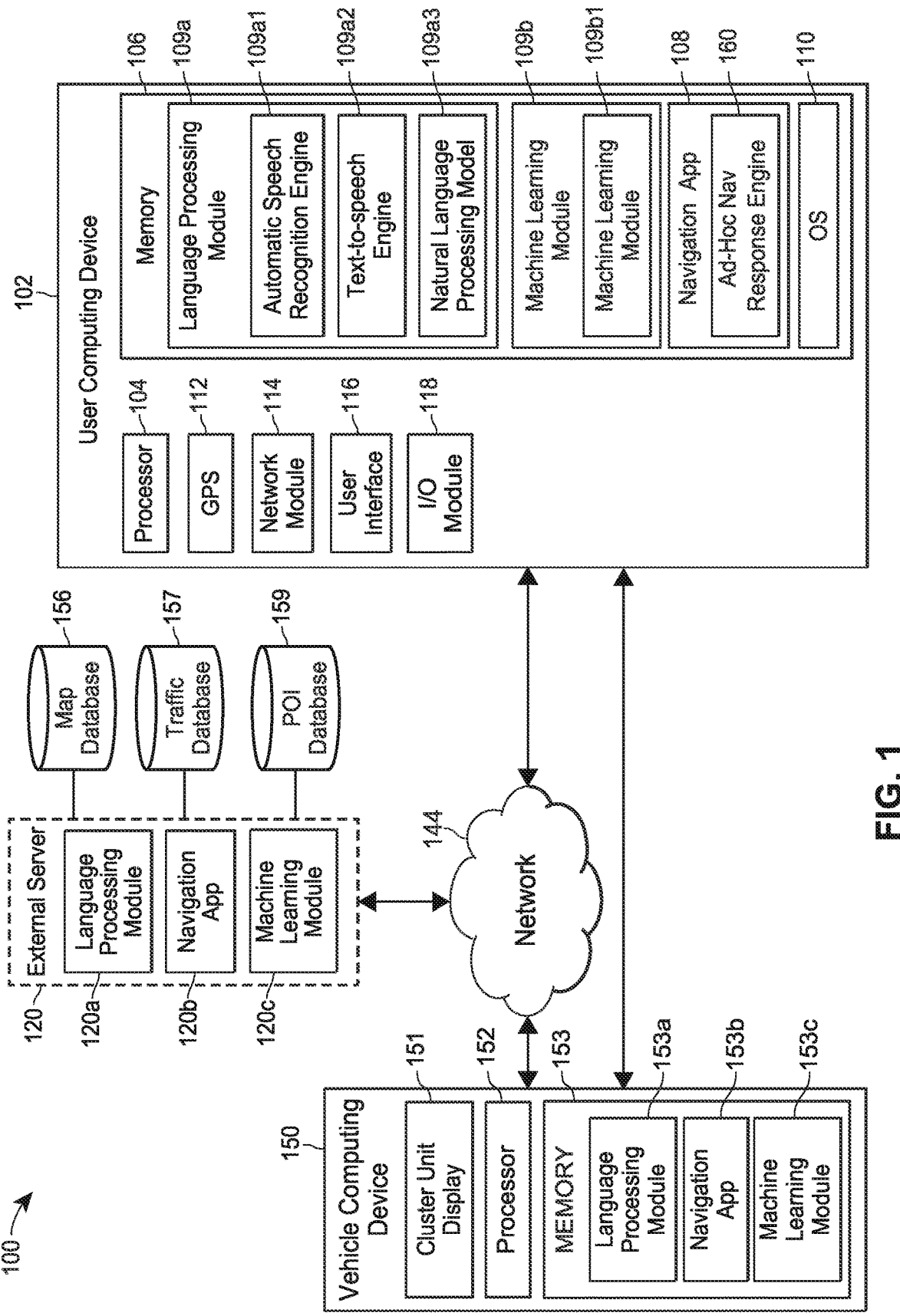
FIG. 1 is a block diagram of an example communication system in which techniques for providing ad-hoc navigation information can be implemented.

Referring to FIG. 1, an example communication system 100 in which techniques for providing ad-hoc navigation information can be implemented includes a user computing device 102. The user computing device 102 may be a portable device such as a smart phone or a tablet computer, for example. The user computing device 102 may also be a laptop computer, a desktop computer, a personal digital assistant (PDA), a wearable device such as a smart watch or smart glasses, a virtual reality headset, etc. In some embodiments, the user computing device 102 may be removably mounted in a vehicle, embedded into a vehicle, and/or may be capable of interacting with a head unit of a vehicle to provide navigation instructions.

The user computing device 102 may include one or more processor(s) 104 and a memory 106 storing machine-readable instructions executable on the processor(s) 104. The processor(s) 104 may include one or more general-purpose processors (e.g., CPUs), and/or special-purpose processing units (e.g., graphical processing units (GPUs)). The memory 106 can be, optionally, a non-transitory memory and can include one or several suitable memory modules, such as random access memory (RAM), read-only memory (ROM), flash memory, other types of persistent memory, etc. The memory 106 may store instructions for implementing a navigation application 108 that can provide navigation directions (e.g., by displaying directions or emitting audio instructions via the user computing device 102), display an interactive digital map, request and receive routing data to provide driving, walking, or other navigation directions, provide various geo-located content such as traffic, points-of-interest (POIs), and weather information, etc. While the examples described herein for providing ad-hoc navigation information include driving information, the techniques may be applied to navigation information for any suitable mode of transportation, such as walking, biking, public transportation, etc.

The navigation application 108 may include an ad-hoc navigation response engine 160. The ad-hoc navigation response engine 160 may receive audio or text requests from a user for navigation information regarding the user's current trip when the user has not initiated a navigation session for the current trip. The user may provide a particular trigger phrase or hot word which causes the ad-hoc navigation response engine 160 to receive the audio request from the user, such as "Hey Maps." The ad-hoc navigation response engine 160 may then analyze the request using the natural language processing techniques described below to identify a destination and/or other attributes included in the request.

When the request does not include a destination, the ad-hoc navigation response engine 160 may obtain previous navigation requests from the user and may infer the destination according to the destinations in the previous navigation requests. For example, the ad-hoc navigation response engine 160 may obtain previous navigation requests stored at the user computing device 102 or at the external server 120. The ad-hoc navigation response engine 160 may also obtain user context data stored at the user computing device 102 or at the external server 120 to infer the destination, such as calendar data, typical destinations at the particular day of the week/time of day, etc.

In response to determining or inferring the destination, the ad-hoc navigation response engine 160 may transmit a request for navigation directions to the external server 120 from the user's current location to the destination along the current trajectory. The ad-hoc navigation response engine 160 may then receive one or more set(s) of navigation directions to the destination from the external server 120 and may analyze the set(s) of navigation directions to provide a response to the request for navigation information. In other implementations, the ad-hoc navigation response engine 160 may obtain an offline set(s) of navigation directions cached at the user computing device 102 and obtained from the external server 120 in a previous request, for example.

Further, the memory 102 may include a language processing module 109a configured to implement and/or support the techniques of this disclosure for providing ad-hoc navigation information through natural conversation. Namely, the language processing module 109a may include an automatic speech recognition (ASR) engine 109a1 that is configured to transcribe speech inputs from a user into sets of text. Further, the language processing module 109a may include a text-to-speech (TTS) engine 109a2 that is configured to convert text into audio outputs, such as audio responses, audio requests, navigation instructions, and/or other outputs for the user. In some scenarios, the language processing module 109a may include a natural language processing (NLP) model 109a3 that is configured to output textual transcriptions, intent interpretations, and/or audio outputs related to a speech input received from a user of the user computing device 102. It should be understood that, as described herein, the ASR engine 109al and/or the TTS engine 109a2 may be included as part of the NLP model 109a3 in order to transcribe user speech inputs into a set of text, convert text outputs into audio outputs, and/or any other suitable function described herein as part of a conversation between the user computing device 102 and the user.

Generally, the language processing module 109 a may include computer-executable instructions for training and operating the NLP model 109 a 3. In general, the language processing module 109 a may train one or more NLP models 109 a 3 by establishing a network architecture, or topology, and adding layers that may be associated with one or more activation functions (e.g., a rectified linear unit, softmax, etc.), loss functions and/or optimization functions. Such training may generally be performed using a symbolic method, machine learning (ML) models, and/or any other suitable training method. More generally, the language processing module 109 a may train the NLP models 109 a 3 to perform two techniques that enable the user computing device 102, and/or any other suitable device (e.g., vehicle computing device 150) to understand the words spoken by a user and/or words generated by a text-to-speech program (e.g., TTS engine 109 a 2) executed by the processor 104: syntactic analysis and semantic analysis.

Syntactic analysis generally involves analyzing text using basic grammar rules to identify overall sentence structure, how specific words within sentences are organized, and how the words within sentences are related to one another. Syntactic analysis may include one or more sub-tasks, such as tokenization, part of speech (POS) tagging, parsing, lemmatization and stemming, stop-word removal, and/or any other suitable sub-task or combinations thereof. For example, using syntactic analysis, the NLP model 109a3 may generate textual transcriptions from the speech inputs from the user. Additionally, or alternatively, the NLP model 109a3 may receive such textual transcriptions as a set of text from the ASR engine 109al in order to perform semantic analysis on the set of text.

Semantic analysis generally involves analyzing text in order to understand and/or otherwise capture the meaning of the text. In particular, the NLP model 109a3 applying semantic analysis may study the meaning of each individual word contained in a textual transcription in a process known as lexical semantics. Using these individual meanings, the NLP model 109a3 may then examine various combinations of words included in the sentences of the textual transcription to determine one or more contextual meanings of the words. Semantic analysis may include one or more sub-tasks, such as word sense disambiguation, relationship extraction, sentiment analysis, and/or any other suitable sub-tasks or combinations thereof. For example, using semantic analysis, the NLP model 109a3 may generate one or more intent interpretations based on the textual transcriptions from the syntactic analysis.

In these aspects, the language processing module 109a may include an artificial intelligence (AI) trained conversational algorithm (e.g., the natural language processing (NLP) model 109a3) that is configured to interact with a user that is accessing the navigation app 108. The user may be directly connected to the navigation app 108 to provide verbal input/responses (e.g., speech inputs), and/or the user request may include textual inputs/responses that the TTS engine 109a2 (and/or other suitable engine/model/algorithm) may convert to audio inputs/responses for the NLP model 109*a*3 to interpret. When a user accesses the navigation app 108, the inputs/responses spoken by the user and/or generated by the TTS engine 109*a*2 (or other suitable algorithm) may be analyzed by the NLP model 109*a*3 to generate textual transcriptions and intent interpretations.

The language processing module 109*a* may train the one or more NLP models 109*a*3 to apply these and/or other NLP techniques using a plurality of training speech inputs from a plurality of users. As a result, the NLP model 109*a*3 may be configured to output textual transcriptions and intent interpretations corresponding to the textual transcriptions based on the syntactic analysis and semantic analysis of the user's speech inputs.

In certain aspects, one or more types of machine learning (ML) may be employed by the language processing module 109*a* to train the NLP model(s) 109*a*3. The ML may be employed by the ML module 109*b*, which may store a ML model 109*b*1. The ML model 109*b*1 may be configured to receive a set of text corresponding to a user input, and to output an intent based on the set of text. The NLP model(s) 109*a*3 may be and/or include one or more types of ML models, such as the ML model 109*b*1. More specifically, in these aspects, the NLP model 109*a*3 may be or include a machine learning model (e.g., a large language model (LLM)) trained by the ML module 109*b* using one or more training data sets of text in order to output one or more training intents and one or more training destinations, as described further herein. For example, artificial neural networks, recurrent neural networks, deep learning neural networks, a Bayesian model, and/or any other suitable ML model 109*b*1 may be used to train and/or otherwise implement the NLP model(s) 109*a*3. In these aspects, training may be performed by iteratively training the NLP model(s) 109*a*3 using labeled training samples (e.g., training user inputs).

In instances where the NLP model(s) 109*a*3 is an artificial neural network, training of the NLP model(s) 109*a*3 may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction.

In embodiments, the one or more NLP models 109*a*3 may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width)

limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

It is noted that although FIG. 1 illustrates the navigation application 108 as a standalone application, the functionality of the navigation application 108 also can be provided in the form of an online service accessible via a web browser executing on the user computing device 102, as a plug-in or extension for another software application executing on the user computing device 102, etc. The navigation application 108 generally can be provided in different versions for different operating systems. For example, the maker of the user computing device 102 can provide a Software Development Kit (SDK) including the navigation application 108 for the Android™ platform, another SDK for the iOS™ platform, etc.

The memory 106 may also store an operating system (OS) 110, which can be any type of suitable mobile or general-purpose operating system. The user computing device 102 may further include one or several sensors such as a global positioning system (GPS) 112 or another suitable positioning module, an accelerometer, a gyroscope, a compass, an inertial measurement unit (IMU), etc., a network module 114, a user interface 116 for displaying map data and directions, and input/output (I/O) module 118. The network module 114 may include one or more communication interfaces such as hardware, software, and/or firmware of an interface for enabling communications via a cellular network, a Wi-Fi network, or any other suitable network such as a network 144, discussed below. The I/O module 118 may include I/O devices capable of receiving inputs from, and providing outputs to, the ambient environment and/or a user. The I/O module 118 may include a touch screen, display, keyboard, mouse, buttons, keys, microphone, speaker, etc. In various implementations, the user computing device 102 can include fewer components than illustrated in FIG. 1 or, conversely, additional components.

The user computing device 102 may communicate with an external server 120 and/or a vehicle computing device 150 via a network 144. The network 144 may include one or more of an Ethernet-based network, a private network, a cellular network, a local area network (LAN), and/or a wide area network (WAN), such as the Internet. The navigation application 108 may transmit map data, navigation directions, and other geo-located content to the vehicle computing device 150 for display on the cluster display unit 151. Moreover, the user computing device 102 may be directly connected to the vehicle computing device 150 through any suitable direct communication link 140, such as a wired connection (e.g., a USB connection).

In certain aspects, the network 144 may include any communication link suitable for short-range communications and may conform to a communication protocol such as, for example, Bluetooth™ (e.g., BLE), Wi-Fi (e.g., Wi-Fi Direct), NFC, ultrasonic signals, etc. Additionally, or alternatively, the network 144 may be, for example, Wi-Fi, a cellular communication link (e.g., conforming to 3G, 4G, or 5G standards), etc. In some scenarios, the network 144 may also include a wired connection.

The external server 120 may be a remotely located server that includes processing capabilities and executable instructions necessary to perform some/all of the actions described herein with respect to the user computing device 102. For example, the external server 120 may include a language processing module 120a that is similar to the language processing module 109a included as part of the user computing device 102, and the module 120a may include one or more of the ASR engine 109a1, the TTS engine 109a2, and/or the NLP model 109a3. The external server 120 may also include a navigation app 120b and a ML module 120c that are similar to the navigation app 108 and ML module 109b included as part of the user computing device 102.

The ad-hoc navigation response engine 160 and the navigation app 120b can operate as components of an ad-hoc navigation system. Alternatively, the ad-hoc navigation system can include only server-side components and simply provide the ad-hoc navigation response engine 160 with responses to requests for navigation information. In other words, ad-hoc navigation techniques in these embodiments can be implemented transparently to the ad-hoc navigation response engine 160. As another alternative, the entire functionality of the navigation app 120b can be implemented in the ad-hoc navigation response engine 160.

Similarly, the language processing module 109a, 120a may include separate components at the user computer device 102 and the external server 120, can only include server-side components and provide language processing outputs to the ad-hoc navigation response engine 160, or the entire functionality of the language processing module 109a, 120a can be implemented at the user computing device 102. Additionally, the ML module 109b, 120c may include separate components at the user computer device 102 and the external server 120, can only include server-side components and provide ML outputs to the language processing module 109a, 120a, or the entire functionality of the ML module 109b, 120c can be implemented at the user computing device 102

The vehicle computing device 150 includes one or more processor(s) 152 and a memory 153 storing computer-readable instructions executable by the processor(s) 152. The memory 153 may store a language processing module 153a, a navigation application 153b, and a ML module 153c that are similar to the language processing module 153a, the navigation application 108, and the ML module 109b, respectively. The navigation application 153b may support similar functionalities as the navigation application 108 from the vehicle-side and may facilitate rendering of information displays, as described herein. For example, in certain aspects, the user computing device 102 may provide the vehicle computing device 150 with an accepted route that has been accepted by a user, and the corresponding navigation instructions to be provided to the user as part of the accepted route. The navigation application 153b may then proceed to render the navigation instructions within the cluster unit display 151 and/or to generate audio outputs that verbally provide the user with the navigation instructions via the language processing module 153a.

In any event, the external server 120 may be communicatively coupled to various databases, such as a map database 156, a traffic database 157, and a point-of-interest (POI) database 159, from which the external server 120 can retrieve navigation-related data. The map database 156 may include map data such as map tiles, visual maps, road geometry data, road type data, speed limit data, etc. The map database 156 may also include route data for providing navigation directions, such as driving, walking, biking, or public transit directions, for example. The traffic database 157 may store historical traffic information as well as real-time traffic information. The POI database 159 may store descriptions, locations, images, and other information regarding landmarks or points-of-interest. While FIG. 1 depicts databases 156, 157, and 159, the external server 120 may be communicatively coupled to additional, or conversely, fewer, databases. For example, the external server 120 may be communicatively coupled to a database storing weather data.

Example Requests for Navigation Information

Figure 2:
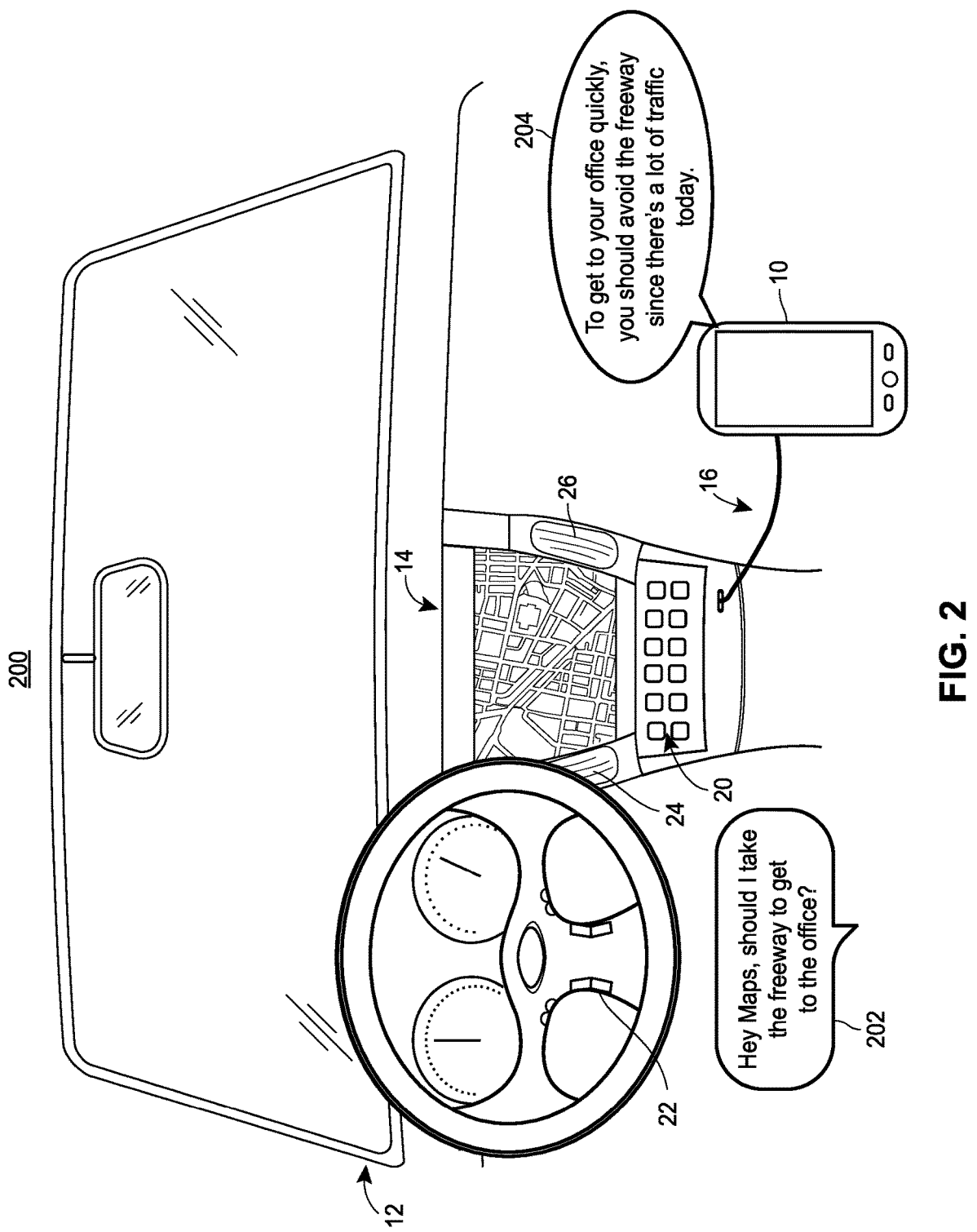
FIG. 2 illustrates an example scenario within a vehicle interior where a user requests navigation information without previously initiating a navigation session and includes a destination in the request.

FIG. 2 illustrates an example scenario 200 where a user requests navigation information without previously initiating a navigation session. The user request may be an audio request. More specifically, the user asks, "Hey Maps, should I take the freeway to get to my office?" 202. The user may be a driver, a front seat passenger, a back seat passenger in the vehicle 12, etc. While the example scenarios in FIGS. 2-4 include requests related to driving directions these are merely a few examples for case of illustration only. The ad-hoc navigation system can be used for any suitable mode of transportation including driving, walking, biking, or public transportation.

Additionally, while the example scenarios described herein are generally in the context of a speech based configuration, the ad-hoc navigation system can also be used in the context of a touch-based or visual interface. For example, user requests for navigation information can be entered via free-form textual input or through UI elements (e.g. a drop-down menu). Responses to the user requests can be displayed to the user via the user interface. Embodiments disclosed herein that are described in the context of a speech-based interface may also be applied to the context of a touch-based interface. All embodiments disclosed herein in which inputs or outputs are described in the context of a speech-based interface may be adapted to apply to the context of a touch-based interface.

The example vehicle 12 in FIG. 2 includes a client device 10 and a head unit 14. The client device 10 communicates with the head unit 14 of the vehicle 12 via a communication link 16, which may be wired (e.g., Universal Serial Bus (USB)) or wireless (e.g., Bluetooth, Wi-Fi Direct). The client device 10 also can communicate with various content providers, servers, etc. via a wireless communication network such as a fourth- or third-generation cellular network (4G or 3G, respectively).

The head unit 14 can include a display 18 for presenting navigation information such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play audio instructions or audio notifications sent from the client device 10.

In the example scenario 200, the user has not initiated a navigation session. In other words, the user does not request navigation directions from the user's current location to the user's office prior to beginning their current trip to the office.

In some implementations, the user may not have launched the navigation application 108 and may simply begin interacting with the user computing device 102 by asking, "Hey Maps, should I take the freeway to get to my office?" The phrase "Hey Maps" may be a hot word or trigger to activate the navigation application 108. In other implementations, the navigation application 108 may be activated and may continuously or periodically obtain location data for the user computing device 102 for example, to determine a current trajectory of the user computing device 102 but may not be executing a navigation session and/or providing navigation directions to the user's office. In another example, having "not initiated a navigation session" may mean that the user computer device 102 is in a state requiring less battery usage and/or less processing power than when a navigation session has been initiated. For example, the user computer device 102 may consume relatively more power when the navigation application 108 has been launched as compared to prior to launch.

In any event, in response to receiving the audio request, the navigation application 108 may communicate with the language processing module 109a, 120a at the user computing device 102 or the external server 120 to interpret the audio request.

More specifically, the user computing device 102 receives the audio request through an input device (e.g., microphone as part of the I/O module 118). The user computing device 102 then utilizes the processor 104 to execute instructions included as part of the language processing module 109a to transcribe the audio request into a set of text. The user computing device 102 may cause the processor 104 to execute instructions comprising, for example, an ASR engine (e.g., ASR engine 109a1) in order to transcribe the audio request from the speech-based input received by the I/O module 118 into the textual transcription of the user input. It should be appreciated that the execution of the ASR engine to transcribe the user input into the textual transcription may be performed by the user computing device 102, the external server 120, the vehicle computing device 150, and/or any other suitable component or combinations thereof.

This transcription of the audio request may then be analyzed, for example, by the processor 104 executing instructions comprising the language processing module 109a and/or the machine learning module 109b to interpret the textual transcription and determine attributes of the request, such as the destination. The user computing device 102 may identify the destination by comparing terms in the audio request to POIs from the POI database 159, addresses included in the map database 156, or predetermined destinations stored in a user profile, such as "Home," "Work." "My Office," etc.

In some implementations, the audio request does not include a destination or the language processing module 109a may identify a term corresponding to a destination, but the term refers to a destination category without specifying a particular destination (e.g., "the restaurant"). In these scenarios, the ad-hoc navigation response engine 160 may infer the destination using previous navigation requests having destinations and/or user context data, such as calendar data, typical destinations at the particular day of the week/time of day, etc. For example, the ad-hoc navigation response engine 160 may obtain previous navigation requests and/or user context data stored at the user computing device 102 or at the external server 120. The ad-hoc navigation response engine 160 may then analyze the pre-vious navigation requests and/or user context data in view of the audio request to infer the destination.

For example, if the audio request includes the destination as "the restaurant" without specifying which restaurant, the ad-hoc navigation response engine 160 may analyze recent navigation requests, set(s) of navigation directions, and/or map data requests which included restaurants as destinations. The ad-hoc navigation response engine 160 may also analyze the user context data to determine whether the user has an upcoming calendar event to go to a particular restaurant, whether based on the time of day/day of the week, the user frequents a particular restaurant (e.g., the user always goes to John's Pizza for lunch on Tuesdays), etc.

In some implementations, such as when multiple restaurants may correspond to "the restaurant" based on recent navigation requests and the context data, the ad-hoc navigation response engine 160 may rank the restaurants as candidate destinations. For example, the candidate destinations may be ranked according to the recency of the request. More specifically, a navigation request for directions to a first restaurant from ten minutes before the audio request may result in a higher ranking for the first restaurant than a navigation request for directions to a second restaurant from an hour ago. The candidate destinations may be scored and/or ranked using any suitable factors (e.g., recency of the search, likelihood that the user visits the candidate destination at the particular time of day/day of the week, whether the user has a calendar event for the candidate destination, whether the candidate destination is along the user's current trajectory (e.g., the user is heading south and the candidate destination is south of the user's current location), etc.).

In some implementations, the ad-hoc navigation response engine 160 may select the highest ranked or scored candidate destination as the destination, and may infer that the highest ranked or scored candidate destination is the destination referred to in the audio request. In other implementations, the ad-hoc navigation response engine 160 may only select a candidate destination when the candidate destination scores above a threshold score or has above a threshold likelihood of being the destination referred to in the audio request. Otherwise, the ad-hoc navigation response engine 160 may provide a response to the user asking the user to clarify the destination.

In addition to identifying the destination in the user's request for navigation information, the language processing module 109a may identify other attributes of the user's request. For example, the language processing module 109a may identify the type of request, such as information regarding an upcoming maneuver on the current trip, information regarding the duration of the current trip, traffic information for the current trip, a set of navigation directions for the current trip, etc. The language processing module 109a may also identify specific parameters within the request, such as the specific maneuver in the request (e.g., a left turn, a highway entrance or exit), the location of the specific maneuver, a specified duration to compare to the remaining duration or the duration for a maneuver (e.g., "Will I arrive at my destination in 15 minutes?" "Will I still be on the freeway in 20 minutes?" etc.).

In any event, the ad-hoc navigation response engine 160 may analyze the destination, attributes, and/or parameters included in the user's request or referred to in the user's request to respond to the user's request. More specifically, the ad-hoc navigation response engine 160 may obtain set(s) of navigation directions (e.g. from the external server) from the user's current location to the determined or inferred destination.

In some implementations, the ad-hoc navigation response engine 160 may determine the user's current trajectory based on location data for the user computing device 102. For example, the ad-hoc navigation response engine 160 may continuously or periodically obtain the current location of the user computing device 102 in response to the user's request or when the navigation application 108 is activated. The ad-hoc navigation response engine 160 may then determine that the user is traveling in a particular direction on a particular road. The ad-hoc navigation response engine 160 may then filter out sets of navigation directions from the user's current location to the destination that do not begin by traveling in the same direction and/or on the same road as the user. In this manner, the ad-hoc navigation response engine 160 may assume that the user's route to the destination includes the user's current trajectory.

The ad-hoc navigation response engine 160 may then analyze the filtered set(s) of navigation directions to generate a response to the user's request for navigation information. In the example scenario 200, the ad-hoc navigation response engine 160 may determine that the destination in the request 202 is the user's office. The ad-hoc navigation response engine 160 may obtain the location of the user's office for example, from a user profile stored at the user computing device 102 or the external server 120. Then the ad-hoc navigation response engine 160 may obtain set(s) of navigation directions from the user's current location to the user's office. The ad-hoc navigation response engine 160 may also determine that the user is currently headed east and may filter sets of navigation directions which do not begin by heading east.

The ad-hoc navigation response engine 160 may also determine, via the language processing module 109a, 120a, that the request type is for information regarding an upcoming maneuver on the current trip, that the upcoming maneuver is for a highway entrance, and the highway entrance is the nearest highway which is also closest to the destination, which is Highway 90. The ad-hoc navigation response engine 160 may then analyze the set(s) of navigation directions to determine whether any include traveling on Highway 90. In some implementations, the ad-hoc navigation response engine 160 may compare a set of navigation directions for a route that includes traveling on Highway 90 to alternative routes that do not include Highway 90. The ad-hoc navigation response engine 160 may determine attributes of the route such as whether the route that includes Highway 90 is the fastest route, whether the route includes construction, or other attributes of the route.

Then the ad-hoc navigation response engine 160 may generate a response to the user's request for example, based on the attributes of the route. For example, when the route that includes Highway 90 is the fastest route, the ad-hoc navigation response engine 160 may generate a response indicating that the user should take the freeway. When there is an alternative route which would get the user to their office faster, the ad-hoc navigation response engine 160 may generate a response indicating that the user should avoid the freeway. In another example, when the route that includes Highway 90 has a similar duration (e.g. the durations are within one or two minutes of each other or the difference in durations is less than a threshold difference) to an alternative route but the alternative route does not have as much traffic or construction, the ad-hoc navigation response engine 160 may generate a response indicating that the user should avoid the freeway. More generally, the response to the user's request may include one or more sets of navigation directions for traveling to the destination, route information for traveling to the destination, traffic information for traveling to the destination, a duration of a remaining portion of the current trip to the destination, a duration for a segment of the route (e.g., the highway portion of the route), traffic information for a segment of the route, etc. Prior to the generation of the response, it may be that no navigation directions or travel information (such as that described above) are being provided to the user. Beneficially, the described process therefore minimizes battery usage and optimizes processing efficiency by only providing the navigation directions or travel information as a response to the user's request. Such benefits are present as the client device 10 or head unit 14, for example, may have their screens/displays powered off, be in a device sleep mode, or otherwise be in a device battery optimization mode until the response to the user's request is required to be provided as an output from such devices.

In the example scenario 200, the route that includes Highway 90 is not the fastest route. Accordingly, the ad-hoc navigation response engine 160 generates a response 204 recommending that the user avoids the freeway due to traffic. The ad-hoc navigation response engine 160 may then provide the response 204 to the user's request for navigation information as an audio output via a speaker, as a visual output on the user interface 116 and/or as a combination of audio/visual output.

The user computing device 102 may generate the text of the response 204 by utilizing the language processing module 109a, and in certain aspects, a large language model (LLM) (e.g., language model for dialogue applications (LaMDA)) (not shown) included as part of the language processing module 109a. Such an LLM may be conditioned/trained to generate the response text based on characteristics of the response, and/or the LLM may be trained to receive a natural language representation of responses to requests for navigation information as input and to output a set of text representing the audio response based on the characteristics.

In any event, when the user computing device 102 fully generates the text of the response 204, the device 102 may proceed to synthesize the text into speech for audio output of the request to the user. In particular, the user computing device 102 may transmit the text of the response 204 to a TTS engine (e.g., TTS engine 109a2) in order to audibly output the response 204 through a speaker (e.g., speaker 26), so that the user may hear and interpret the response. Additionally, or alternatively, the user computing device 102 may also visually prompt the user by displaying the text of the response on a display screen (e.g., cluster display unit 151, user interface 116), so that the user may interact (e.g., click, tap, swipe, etc.) with the display screen and/or verbally acknowledge the response 204.

Figure 3:
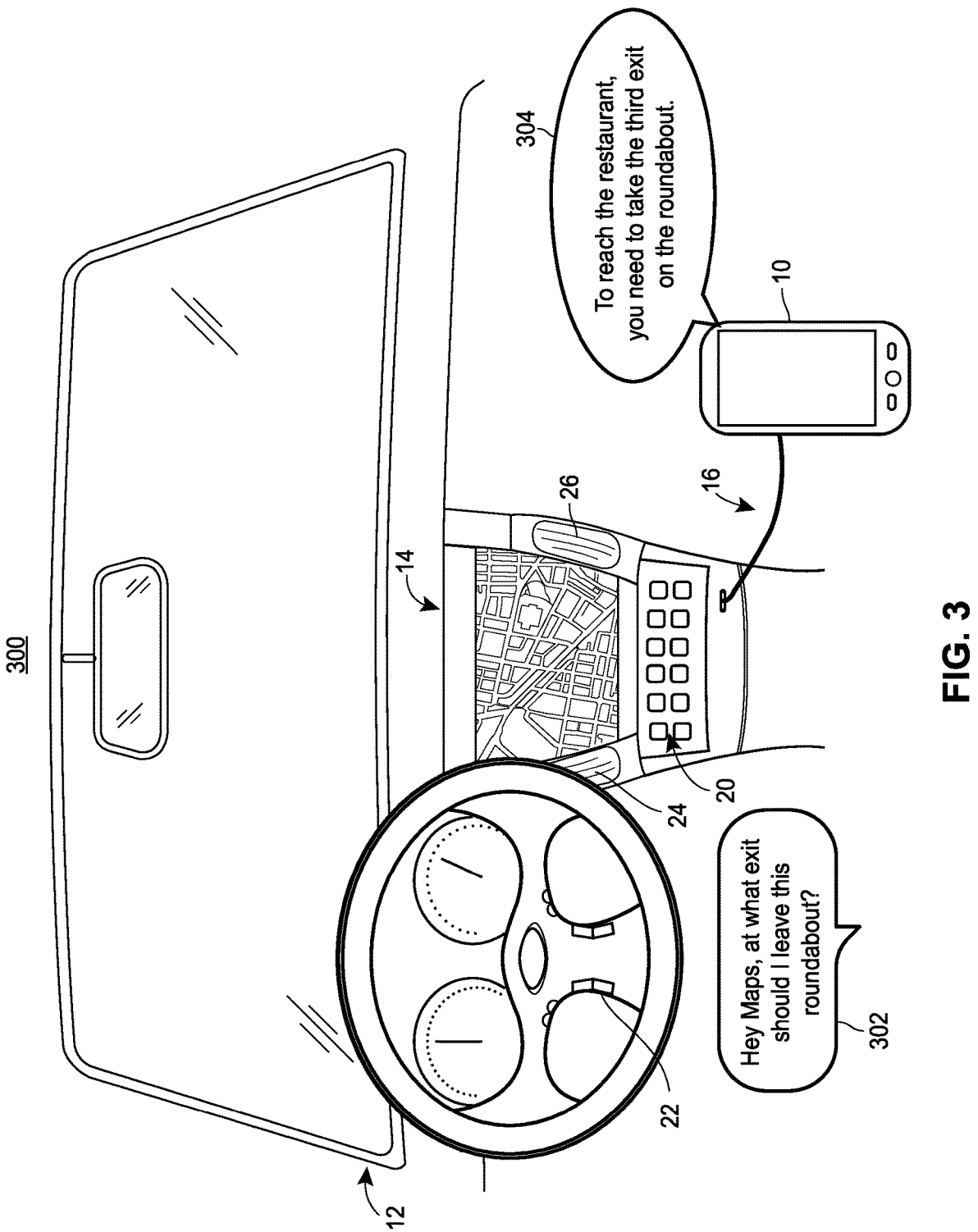
FIG. 3 illustrates another example scenario within a vehicle interior where a user requests navigation information without previously initiating a navigation session and without including a destination in the request.

FIG. 3 illustrates another example scenario 300 where a user requests navigation information without previously initiating a navigation session. In this scenario 300, the user does not include a destination in the request. More specifically, the user asks, "Hey Maps, at what exit should I leave this roundabout?" 302. As in the example scenario 200, the user did not previously initiate a navigation session before providing this request for navigation information.

In the scenario 300, the user request does not include a destination. Accordingly, the ad-hoc navigation response engine 160 may infer the destination using previous navigation requests having destinations and/or user context data, such as calendar data, typical destinations at the particular day of the week/time of day, etc. For example, the ad-hoc navigation response engine 160 may determine that the user's most recent navigation request was for navigation directions to John's Pizza. In another example, the ad-hoc navigation response engine 160 may determine that the user's calendar includes a meeting at John's Pizza within a threshold duration of the current time (e.g., 15 minutes, 30 minutes, an hour, etc.). As a result, the ad-hoc navigation response engine 160 may infer that the destination is John's Pizza.

In addition to inferring the destination, the language processing module 109*a* may identify other attributes of the user's request. For example, the language processing module 109*a* may identify the type of request as information regarding an upcoming maneuver on the current trip. The language processing module 109*a* may also identify specific parameters within the request, such as the roundabout exit for the next maneuver on the current trip.

Then the ad-hoc navigation response engine 160 may obtain set(s) of navigation directions (e.g. from the external server) from the user's current location to the inferred destination (John's Pizza). The ad-hoc navigation response engine 160 may also determine the user's current trajectory based on location data for the user computing device 102. For example, the ad-hoc navigation response engine 160 may continuously or periodically obtain the current location of the user computing device 102 in response to the user's request, when the navigation application 108 is activated, or in any other suitable situation, such as when the user computing device 102 detects that the user is traveling (e.g., the speed of the user computing device 102 is above a threshold speed, such as 10 mph). The ad-hoc navigation response engine 160 may then determine that the user is traveling in a particular direction on a particular road.

Additionally, the ad-hoc navigation response engine 160 may determine the user's current trajectory based on the user's request for navigation information. More specifically, the request indicates the user is traveling on a roundabout, so the ad-hoc navigation response engine 160 may determine that the particular road on which the user is traveling is a roundabout. The ad-hoc navigation response engine 160 may compare the trajectory obtained from location data to trajectory information indicated in the request (e.g., a roundabout) to ensure that the trajectory obtained from the location data matches the trajectory information indicated in the request. If there is a mismatch, the ad-hoc navigation response engine 160 may adjust the trajectory obtained from the location data to a proximate road that matches the trajectory information indicated in the request or may provide a response to the user asking for clarification regarding the request.

In any event, the ad-hoc navigation response engine 160 may then filter out sets of navigation directions from the user's current location to the destination that do not include a roundabout and/or do not include exiting a roundabout as the next maneuver. The ad-hoc navigation response engine 160 may then analyze the filtered set(s) of navigation directions to generate a response to the user's request for navigation information. More specifically, the ad-hoc navigation response engine 160 may analyze the filtered set(s) of navigation directions which each include exiting a roundabout to determine the roundabout exit for traveling to John's Pizza. In some scenarios, the ad-hoc navigation response engine 160 may identify the same roundabout exit for each of the filtered set(s) of navigation directions (e.g., the third roundabout exit), and may determine that this is the exit for traveling to John's Pizza.

In other scenarios, the ad-hoc navigation response engine 160 may identify different roundabout exits for different sets of navigation directions. In these scenarios, the ad-hoc navigation response engine 160 may identify the roundabout exit for the fastest route to John's Pizza, for the shortest route to John's Pizza, for the route that avoids traffic or construction, etc. The ad-hoc navigation response engine 160 may then provide the response 304 to the user's request for navigation information as an audio output via a speaker, as a visual output on the user interface 116 and/or as a combination of audio/visual output. The response 304 may indicate the destination (e.g., To reach the restaurant, you need to take the third exit on the roundabout) so that the user can confirm that the inferred destination is the correct destination. If the inferred destination is not the correct destination, the user may provide a follow-up request.

Figure 4:
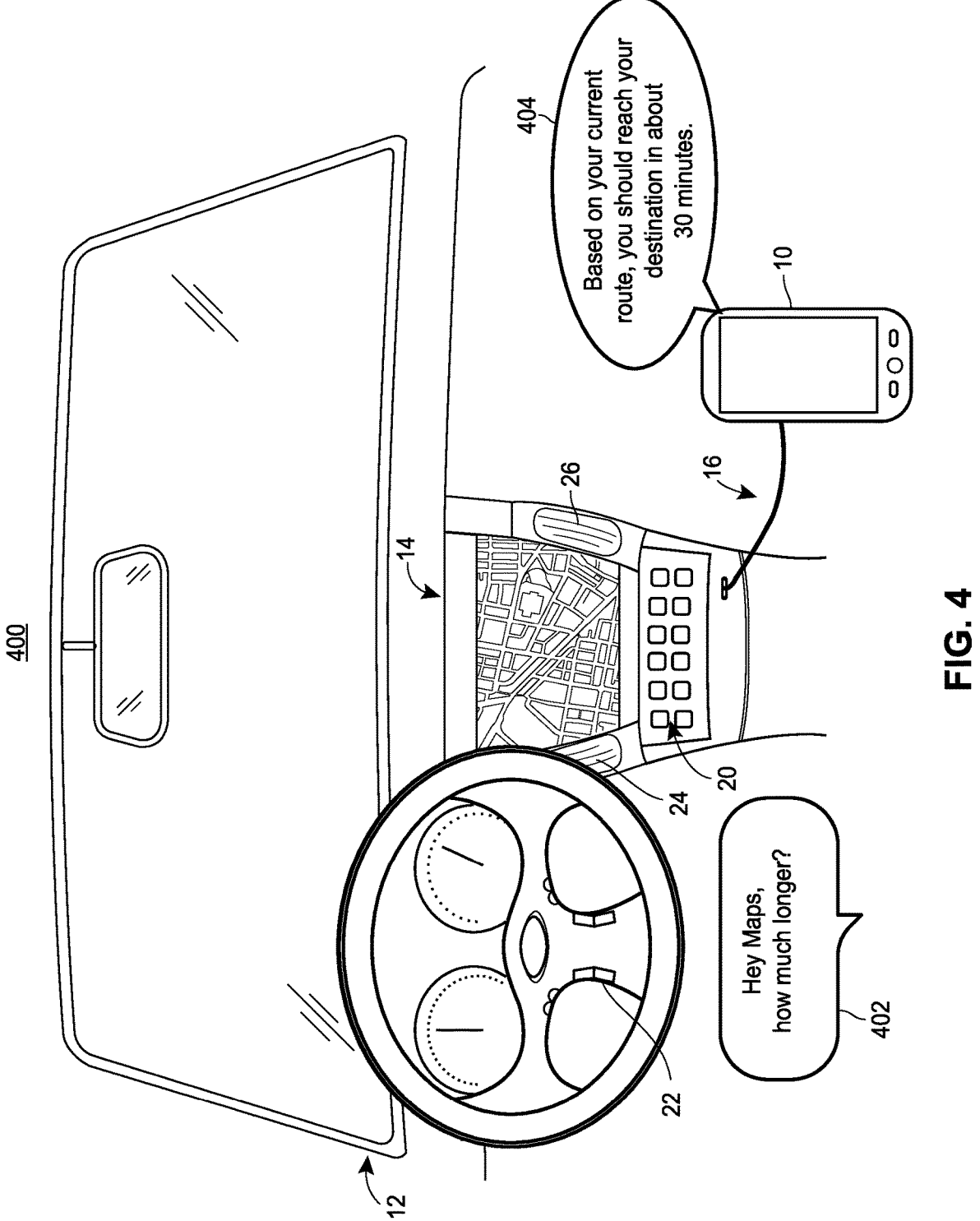
FIG. 4 illustrates yet another example scenario within a vehicle interior where a user requests navigation information without previously initiating a navigation session and without including a destination in the request.

FIG. 4 illustrates yet another example scenario 400 where a user requests navigation information without previously initiating a navigation session. In this scenario 400, the user also does not include a destination in the request. More specifically, the user asks, "Hey Maps, how much longer?" 402. As in the example scenarios 200, 300, the user did not previously initiate a navigation session before providing this request for navigation information.

In the scenario 400, the user request does not include a destination. Accordingly, the ad-hoc navigation response engine 160 may infer the destination using previous navigation requests having destinations and/or user context data, such as calendar data, typical destinations at the particular day of the week/time of day, etc. For example, the ad-hoc navigation response engine 160 may determine that at the current time of day and/or day of the week (e.g., 5 p.m. on a Monday) the user typically travels home from work. As a result, the ad-hoc navigation response engine 160 may infer that the destination is the user's home.

In addition to inferring the destination, the language processing module 109*a* may identify other attributes of the user's request. For example, the language processing module 109*a* may identify the type of request as information regarding the duration of the current trip. The language processing module 109*a* may also identify specific parameters within the request, such as the amount of time remaining to reach the destination.

Then the ad-hoc navigation response engine 160 may obtain set(s) of navigation directions (e.g. from the external server) from the user's current location to the inferred destination (the user's home). The ad-hoc navigation response engine 160 may also determine the user's current trajectory based on location data for the user computing device 102. For example, the ad-hoc navigation response engine 160 may continuously or periodically obtain the current location of the user computing device 102 in response to the user's request or when the navigation application 108 is activated. The ad-hoc navigation response engine 160 may then determine that the user is traveling in a particular direction on a particular road.

The ad-hoc navigation response engine 160 may then filter out sets of navigation directions from the user's current location to the destination that do not begin by traveling in the same direction and on the same road as the user. The ad-hoc navigation response engine 160 may then analyze the filtered set(s) of navigation directions to generate a response to the user's request for navigation information. More specifically, the ad-hoc navigation response engine 160 may analyze the filtered set(s) of navigation directions and/or current traffic data on the respective route(s) to identify the durations of each set of navigation directions. The ad-hoc navigation response engine 160 may then select the duration for the fastest route as the duration to include in the response 404.

In other implementations, the ad-hoc navigation response engine 160 may select the duration for the most common route as the duration to include in the response 404. More specifically, the fastest route may include several side streets and/or shortcuts that most users are not typically aware of. Another route may include roads users are more likely to take such as highways, and the ad-hoc navigation response engine 160 may select the duration for this route as the most likely duration for the user. In another example, the most common route may be the route that the user typically takes according to the user's navigation history. The ad-hoc navigation response engine 160 may compare the filtered set(s) of navigation directions to the route(s) from the user's place of work to the user's home to identify one of the filtered set(s) of navigation directions which matches the route that the user typically takes from work to their home.

The ad-hoc navigation response engine 160 may then provide the response 404 to the user's request for navigation information as an audio output via a speaker, as a visual output on the user interface 116 and/or as a combination of audio/visual output. The response 404 may include the selected duration and may indicate that the user will reach their destination in about 30 minutes.

Figure 5:
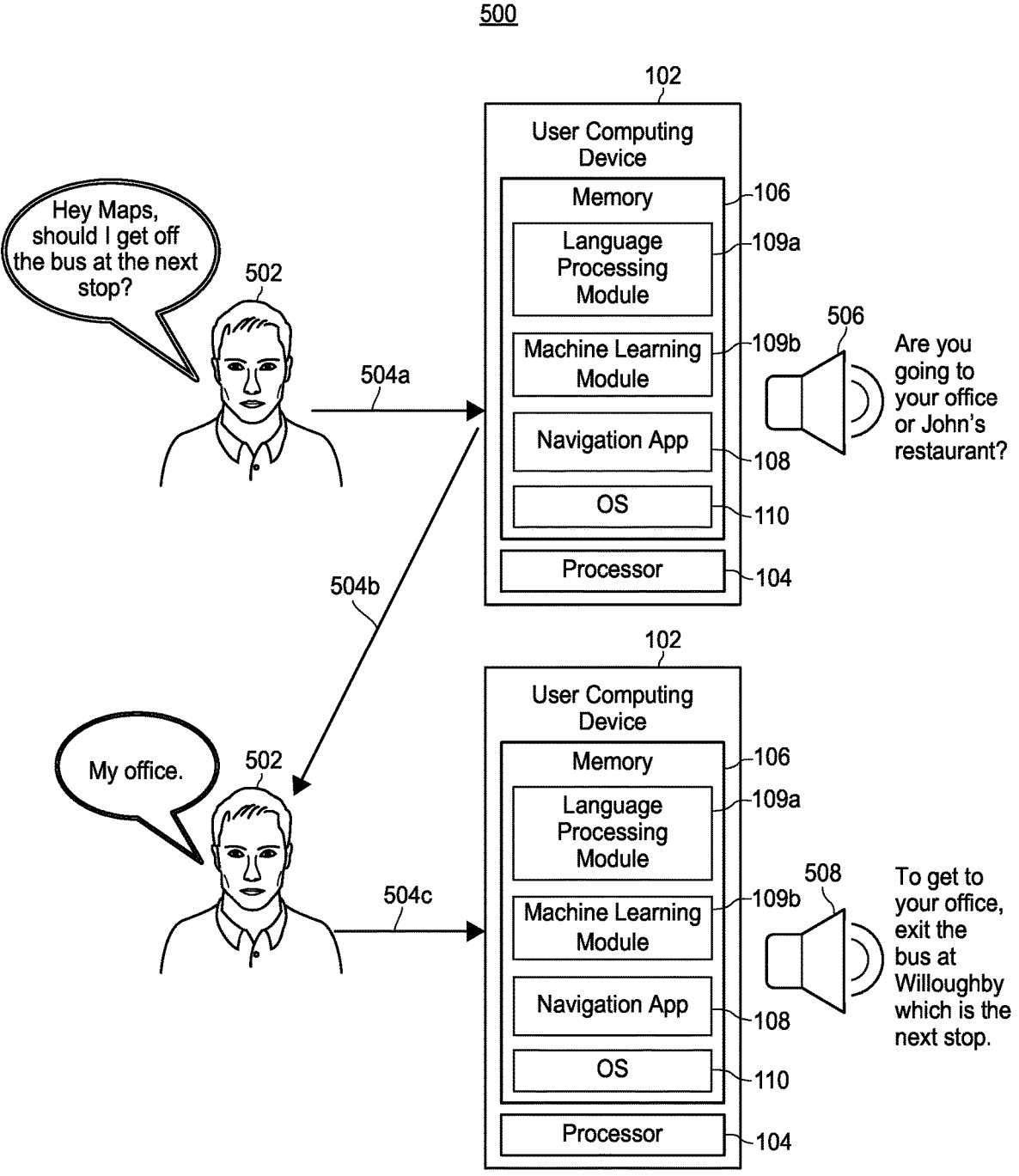
FIG. 5 illustrates an example interaction between the user and the user computing device of FIG. 1, where the user computing device requests the user to clarify a navigation information request.
Figure 6:
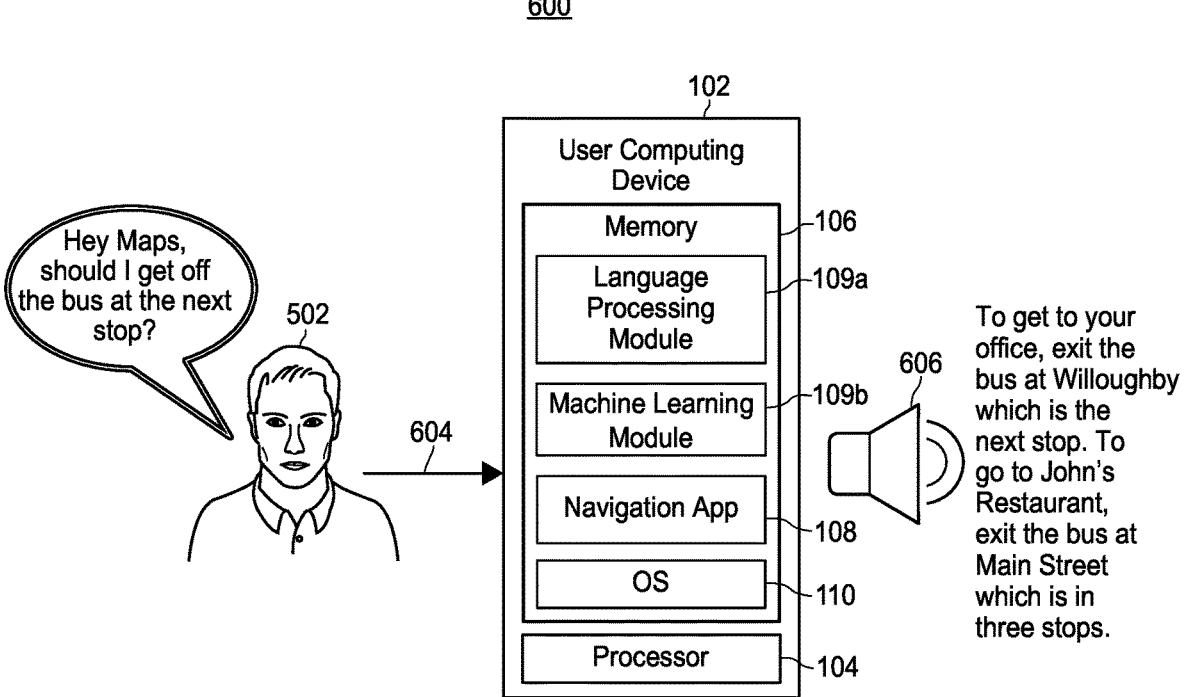
FIG. 6 illustrates another example interaction between the user and the user computing device of FIG. 1, where the user computing device provides alternative responses for multiple potential destinations.
Figure 7:
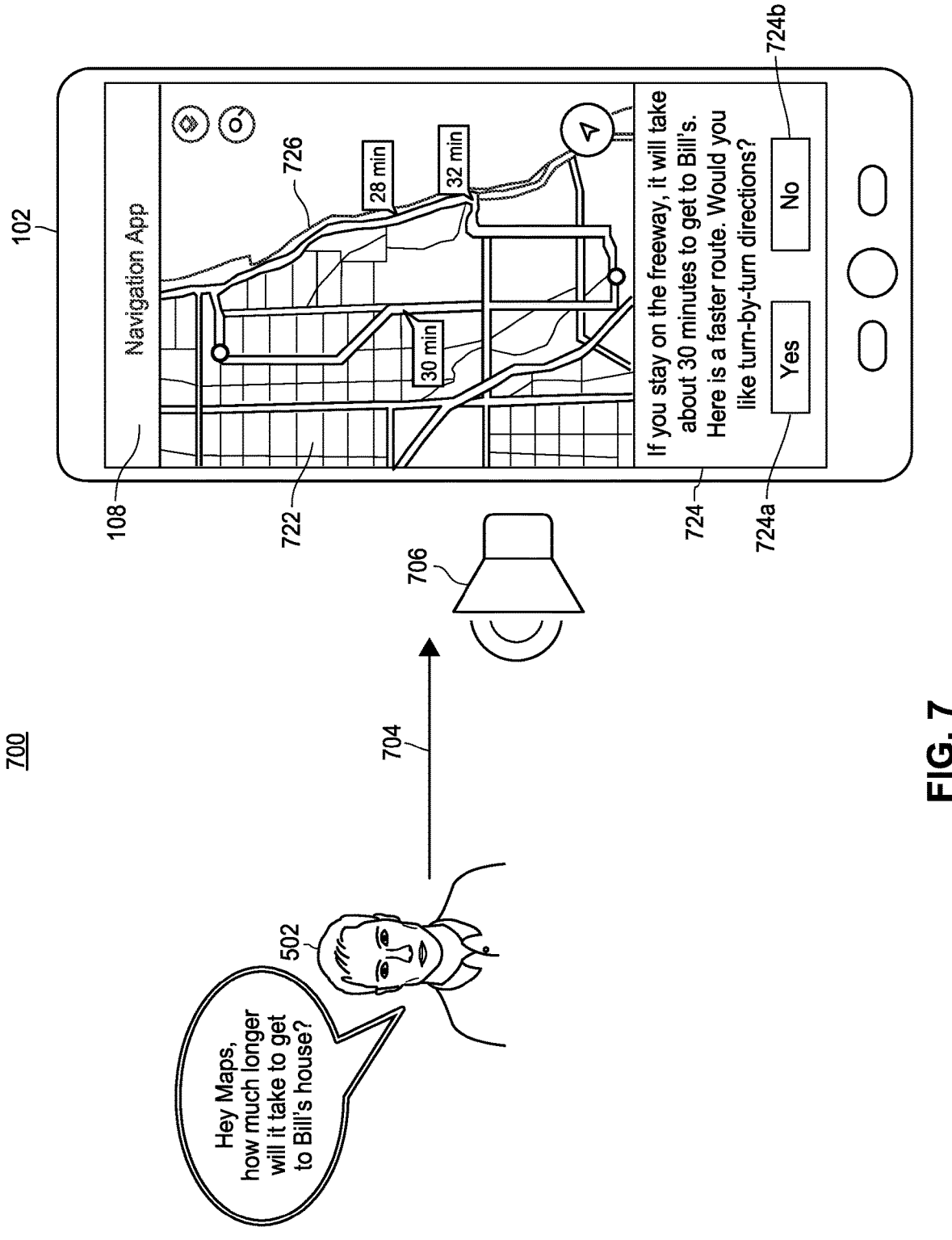
FIG. 7 illustrates yet another example interaction between the user and the user computing device of FIG. 1, where the user computing device provides a prompt for the user to initiate a navigation session to receive navigation directions to the user's destination.

FIGS. 5-7 illustrate example interactions between a user 502 and the user computing device 102 when the user requests navigation information prior to initiating a navigation session. In the example scenario 500 of FIG. 5, the user 502 does not include a destination in the request. More specifically, the user 502 asks 504a, "Hey Maps, should I get off the bus at the next stop?"

The ad-hoc navigation response engine 160 may then infer the destination using previous navigation requests having destinations and/or user context data, such as calendar data, typical destinations at the particular day of the week/time of day, etc. The ad-hoc navigation response engine 160 may identify multiple candidate destinations (e.g., the user's office and John's Restaurant) and may rank or score the candidate destinations using any suitable factors (e.g., recency of the search, likelihood that the user visits the candidate destination at the particular time of day/day of the week, whether the user has a calendar event for the candidate destination, etc.). In this scenario 500, neither of the candidate destinations has a score above a threshold score, a likelihood of being the destination referred to in the request above a threshold likelihood, and/or a score that is more than a threshold amount above the score for the other candidate destination.

As a result, the user computing device 102 may transmit 504b a first response 506 to the user 502 prompting the user 502 to clarify whether the destination is John's Restaurant or the user's office. The user 502 may then respond by transmitting 504c a clarification response indicating that the destination is the user's office. The user computing device 102 may then determine the user's current trajectory based on location data for the user computing device 102 and/or trajectory information included in the user's request for navigation information (e.g., traveling on a bus). The user computing device 102 may also obtain set(s) of navigation directions from the user's current location to the user's office and may filter out sets of navigation directions that do not include traveling on a bus from the user's current location.

The user computing device 102 may then analyze the filtered set(s) of navigation directions to generate a second response 508 to the user's request for navigation information. In some scenarios, the user computing device 102 may identify the same bus stop for each of the filtered set(s) of navigation directions (e.g., Willoughby which is the next stop), and may determine that this is the bus stop for traveling to the user's office.

In other scenarios, the user computing device 102 may identify different bus stops for different sets of navigation directions. In these scenarios, the user computing device 102 may identify the bus stop for the fastest route to the user's office, for the shortest route to the user's office, for the route that avoids traffic or construction, etc. The user computing device 102 may then provide the second response 508 to the user's request for navigation information as an audio output via a speaker, as a visual output on the user interface 116 and/or as a combination of audio/visual output.

It should be noted that the user computing device 102 may generally allow the user 502 several seconds (e.g., 5-10 seconds) to respond following transmission of the first response 506 which includes an audio request through the speaker 26 in order to give the user 502 enough time to think of a proper response without continually listening to the interior of the automobile. By default, the user computing device 102 may not activate a microphone and/or other listening device (e.g., included as part of the I/O module 118) while running the navigation app 108, and/or while processing information received through the microphone by, or in accordance with, for example, the processor 104, the language processing module 109a, the machine learning module 109b, and/or the OS 110. Thus, the user computing device 102 may not actively listen to a vehicle interior during a navigation session and/or at any other time, except when the user computing device 102 provides an audio request to the user 502, to which, the user computing device 102 may expect a verbal response from the user 502 within several seconds of transmission.

FIG. 6 illustrates an example scenario 600 which is similar to the example scenario 500 of FIG. 5. In the example scenario 600, the user 502 asks 604, "Hey Maps, should I get off the bus at the next stop?" This is the same user request as in the example scenario 500. Accordingly, the user computing device 102 identifies multiple candidate destinations (e.g., the user's office and John's Restaurant) for the user request, where neither of the candidate destinations has a score above a threshold score, a likelihood of being the destination referred to in the request above a threshold likelihood, and/or a score that is more than a threshold amount above the score for the other candidate destination.

However, instead of prompting the user 502 to clarify whether the destination is John's Restaurant or the user's office, the user computing device 102 generates a response 606 which provides navigation information for traveling to both candidate destinations. More specifically, the response 606 states, "To get to your office, exit the bus at Willoughby which is the next stop. To go to John's Restaurant, exit the bus at Main Street which is in three stops." Then the user 502 may determine the stop based on the user's 502 destination. The user computing device 102 may include alternative responses for each candidate destination in the response 606, instead of selecting one of the candidate destinations as the destination for the response 606 or prompting the user 502 to clarify the destination.

FIG. 7 illustrates yet another example scenario 700 where the user computing device prompts the user 502 to initiate a navigation session in response to the user's request for navigation information. In the example scenario 700, the user asks 704, "Hey Maps, how much longer will it take to get to Bill's house?"

The user computing device 102 may identify the address of Bill's house from contact information stored for Bill at the user computing device 102, from previous navigation requests to Bill's house, from a pre-stored address for Bill's house, etc. The user computing device 102 may then obtain set(s) of navigation directions from the user's current location to Bill's house.

The user computing device 102 may also determine the user's 502 current trajectory based on location data for the user computing device 102. For example, the user computing device 102 may determine that the user 502 is currently traveling south on Highway 90. Then the user computing device 102 may analyze the set(s) of navigation directions in view of the user's 502 current trajectory to generate a response to the user's 502 request for navigation information. In the example scenario 700, the user computing device 102 may determine that the fastest route to Bill's house continuing on the freeway will take about 30 minutes. However, the user computing device 102 may also determine that there is a faster route if the user 502 exits Highway 90 and travels on other roads to Bill's house.

Accordingly, the user computing device 102 may generate a response 706 to the user's 502 request indicating that the expected duration while traveling on the freeway is about 30 minutes to Bill's house. However, there is a faster route 726 if the user 502 exits the freeway. The response 706 may be presented as an audio response 706 and also as a text response 724 on the user interface 116 of the user computing device 102. Also, the text response 724 and/or the audio response 706 may include a prompt with user controls 724a, 724b for the user 502 to select whether they want to receive turn-by-turn directions for the faster route 726. In response to receiving a selection of the user control 724a indicating that the user 502 would like to initiate a navigation session (e.g., via a touch selection or audio input), the user computing device 102 may initiate the navigation session and provide navigation directions for the faster route to Bill's house as audio directions and/or via a navigation display 722 on the user computing device 102.

Example Method for Providing Ad-Hoc Navigation Information

Figure 8:
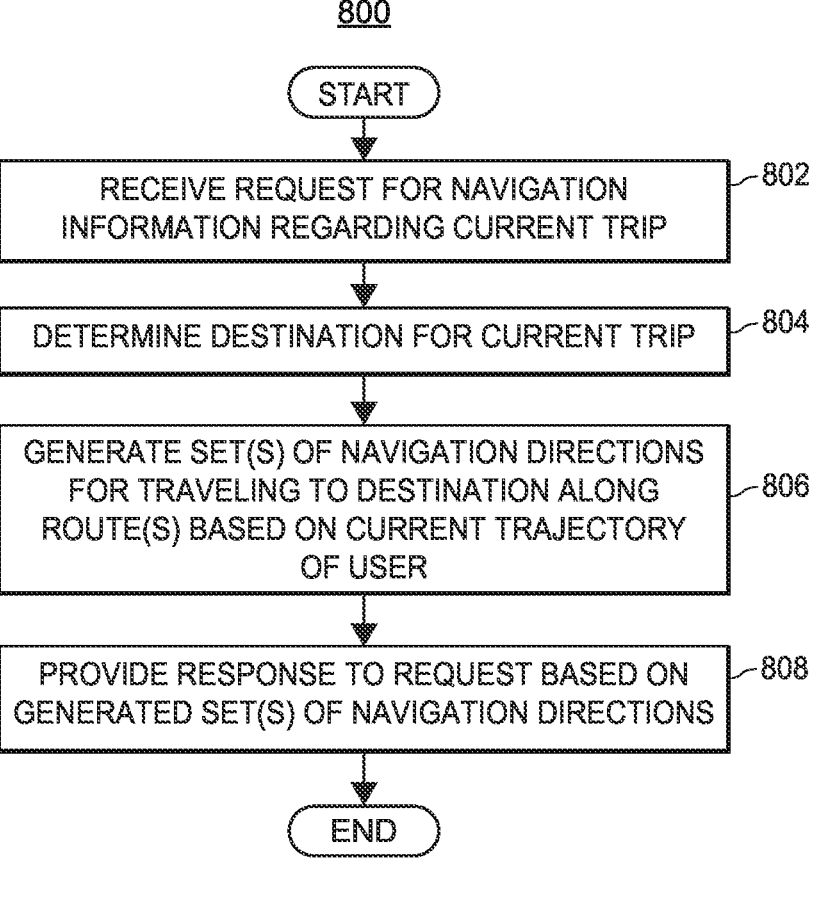
FIG. 8 is a flow diagram of an example method for providing navigation information regarding a current trip by a user without the user having previously initiated a navigation session, which can be implemented in a computing device, such as the user computing device of FIG. 1.

FIG. 8 is a flow diagram of an example method 800 for providing navigation information regarding a current trip by a user without the user having previously initiated a navigation session, which can be implemented in a computing device, such as the user computing device 102 of FIG. 1. It is to be understood that, throughout the description of FIG. 8, actions described as being performed by the user computing device 102 may, in some implementations, be performed by the external server 120, the vehicle computing device 150, and/or may be performed by the user computing device 102, the external server 120, and/or the vehicle computing device 150 in parallel. For example, the user computing device 102, the external server 120, and/or the vehicle computing device 150 may utilize the language processing module 109a, 120a, 153a and/or the machine learning module 109b, 120c, 153c to provide ad-hoc navigation information.

The method 800 can be implemented in a set of instructions stored on a computer-readable memory and executable at one or more processors of the user computing device 102 (e.g., the processor(s) 104). For example, the method 800 may be executed by the ad-hoc navigation response engine 160.

At block 802, the ad-hoc navigation response engine 160 may receive a request for navigation information regarding a current trip prior to the user initiating a navigation session. The request may be received as an audio request or via text input. The user may provide a particular trigger phrase or hot word which causes the ad-hoc navigation response engine 160 to receive the audio request from the user, such as "Hey Maps." In some implementations, the user may not have launched the navigation application 108 prior to providing the request. In other implementations, the navigation application 108 may be activated and may continuously or periodically obtain location data for the user computing device 102 for example, to determine a current trajectory of the user computing device 102 but may not be executing a navigation session and/or providing navigation directions to the destination.

Then at block 804, the ad-hoc navigation response engine 160 may determine a destination for the user's current trip. For example, the ad-hoc navigation response engine 160 may identify the destination by comparing terms in the request for navigation information to POIs from the POI database 159, addresses included in the map database 156, or predetermined destinations stored in a user profile, such as "Home," "Work," "My Office," etc.

In some implementations, the request does not include a destination or the language processing module 109a may identify a term corresponding to a destination, but the term refers to a destination category without specifying a particular destination (e.g., "the restaurant"). In these scenarios, the ad-hoc navigation response engine 160 may infer the destination using previous navigation requests having destinations and/or user context data, such as calendar data, typical destinations at the particular day of the week/time of day, etc.

In some implementations, such as when multiple destinations may correspond to the destination based on recent navigation requests and the context data, the ad-hoc navigation response engine 160 may rank the candidate destinations. The candidate destinations may be scored and/or ranked using any suitable factors (e.g., recency of the search, likelihood that the user visits the candidate destination at the particular time of day/day of the week, whether the user has a calendar event for the candidate destination, etc.).

In some implementations, the ad-hoc navigation response engine 160 may select the highest ranked or scored candidate destination as the destination, and may infer that the highest ranked or scored candidate destination is the destination referred to in the audio request. In other implementations, the ad-hoc navigation response engine 160 may only select a candidate destination when the candidate destination scores above a threshold score or has above a threshold likelihood of being the destination referred to in the audio request. Otherwise, the ad-hoc navigation response engine 160 may provide a response to the user asking the user to clarify the destination. In yet other implementations, the ad-hoc navigation response engine 160 may select multiple destinations and may include alternative sets of navigation information for each of the destinations in the response.

At block 806, the ad-hoc navigation response engine 160 may generate a set(s) of navigation directions for traveling from the user's current location to the destination along a route(s) based on the user's current trajectory. For example, the ad-hoc navigation response engine 160 may communicate with the external server 120 to receive the set(s) of navigation directions from the map database 156. In other implementations, the ad-hoc navigation response engine 160 may obtain offline navigation directions cached at the user computing device 102 for example, after receiving the navigation directions from a previous request for a route to the destination. The ad-hoc navigation response engine 160 may determine the user's current trajectory based on location data for the user computing device 102. For example, the ad-hoc navigation response engine 160 may continuously or periodically obtain the current location of the user computing device 102 in response to the user's request or when the navigation application 108 is activated. The ad-hoc navigation response engine 160 may then determine that the user is traveling in a particular direction on a particular road. The ad-hoc navigation response engine 160 may filter out sets of navigation directions from the user's current location to the destination that do not begin by traveling in the same direction and on the same road as the user.

Then at block 808, the ad-hoc navigation response engine 160 may provide a response to the request for navigation information based on the generated set(s) of navigation directions. The ad-hoc navigation response engine 160 may generate the text of the response by utilizing the language processing module 109*a*, and in certain aspects, an LLM (e.g., LaMDA) included as part of the language processing module 109*a*. Such an LLM may be conditioned/trained to generate the response text based on characteristics of the response, and/or the LLM may be trained to receive a natural language representation of responses to requests for navigation information as input and to output a set of text representing the audio response based on the characteristics.

In any event, when the ad-hoc navigation response engine 160 fully generates the text of the response, the user computing device 102 may proceed to synthesize the text into speech for audio output of the request to the user. In particular, the user computing device 102 may transmit the text of the response to a TTS engine (e.g., TTS engine 109*a*2) in order to audibly output the response through a speaker (e.g., speaker 206), so that the user may hear and interpret the response. Additionally, or alternatively, the user computing device 102 may also visually prompt the user by displaying the text of the response on a display screen (e.g., cluster display unit 151, user interface 116), so that the user may interact (e.g., click, tap, swipe, etc.) with the display screen and/or verbally acknowledge the response.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 800 may include one or more function blocks, modules, individual functions or routines in the form of tangible computer-executable instructions that are stored in a computer-readable storage medium, optionally a non-transitory computer-readable storage medium, and executed using a processor of a computing device (e.g., a server device, a personal computer, a smart phone, a tablet computer, a smart watch, a mobile computing device, or other client computing device, as described herein). The method 800 may be included as part of any backend server (e.g., a map data server, a navigation server, or any other type of server computing device, as described herein), client computing device modules of the example environment, for example, or as part of a module that is external to such an environment. Though the figures may be described with reference to the other figures for case of explanation, the method 800 can be utilized with other objects and user interfaces. Furthermore, although the explanation above describes steps of the method 800 being performed by specific devices (such as a user computing device), this is done for illustration purposes only. The blocks of the method 800 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for determining places and routes through natural conversation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing navigation information regarding a current trip by a user without the user having previously initiated a navigation session, the method comprising:
   receiving, at one or more processors, a request for navigation information regarding a current trip by a user prior to the user initiating the navigation session;
   converting, by the one or more processors executing a language processing module, the request into a transcript, wherein the language processing module is trained by a machine learning model using labeled training sets;
   identifying, by the one or more processors executing the language processing module, navigation-specific attributes of the transcript;
   detecting within the transcript a term related to the current trip;
   automatically launching, by the one or more processors based on the analysis of the request, a navigation application;
   determining, by the navigation application, a destination for the current trip based on a current trajectory of the user;
   generating, by the navigation application, one or more sets of navigation directions for traveling from a current location of the user to the determined destination for the current trip along one or more routes based on the current trajectory of the user; and
   providing, by the one or more processors, a response to the request for navigation information based on the generated one or more sets of navigation directions.

2. The method of claim 1, wherein the request for navigation information is received prior to launching a navigation application.

3. The method of claim 1, wherein the request does not include the destination for the current trip.

4. The method of claim 1, wherein determining the destination for the current trip includes at least one of:
   determining, by the one or more processors, the destination for the current trip as a destination included in the request for navigation information;
   inferring, by the one or more processors, the destination for the current trip based on a destination included in a previous request; or
   inferring, by the one or more processors, the destination for the current trip based on user context data.

5. The method of claim 1, wherein providing a response to the request for navigation information includes providing at least one of:
   the generated one or more sets of navigation directions,
   route information for traveling to the destination,
   traffic information for traveling to the destination, or
   a duration of a remaining portion of the current trip to the destination.

6. The method of claim 1, wherein the destination is a destination included in a previous request and wherein generating the one or more sets of navigation directions includes:
   obtaining, by the one or more processors, the one or more sets of navigation directions cached from the previous request.

7. The method of claim 1, wherein the request is an audio request and the response to the request is an audio response.

8. The method of claim 1, wherein the request is for a duration of a remaining portion of the current trip to a particular destination, and the response includes an indication of the duration of the remaining portion of the current trip to the particular destination based on a most likely route to the particular destination according to the current trajectory and current traffic data on the route.

9. A computing device for providing navigation information regarding a current trip by a user without the user having previously initiated a navigation session, the computing device comprising:

one or more processors; and a computer-readable memory coupled to the one or more processors and storing instructions thereon that, when executed by the one or more processors, cause the computing device to:

receive a request for navigation information regarding a current trip by the user prior to a user initiating the navigation session;

convert, by a language processing module executing on the one or more processors, the request into a transcript, wherein the language processing module is trained by a machine learning model using labeled training sets;

identify, by a language processing module executing on the one or more processors, navigation-specific attributes of the transcript;

detect within the transcript a term related to the current trip;

automatically launch, based on the analysis of the request, a navigation application;

determine, by the navigation application, a destination for the current trip based on a current trajectory of the user;

generate, by the navigation application, one or more sets of navigation directions for traveling from a current location of the user to the determined destination of the current trip along one or more routes based on the current trajectory of the user; and provide a response to the request for navigation information based on the generated one or more sets of navigation directions.

10. The computing device of claim 9, wherein the request for navigation information is received prior to launching a navigation application.

11. The computing device of claim 9, wherein the request does not include the destination for the current trip.

12. The computing device of claim 9, wherein to determine the destination for the current trip, the instructions cause the computing device to at least one of:

determine the destination for the current trip as a destination included in the request for navigation information;

infer the destination for the current trip based on a destination included in a previous request; or infer the destination for the current trip based on user context data.

13. The computing device of claim 9, wherein to provide a response to the request for navigation information, the instructions cause the computing device to provide at least one of:

the generated one or more sets of navigation directions, route information for traveling to the destination, traffic information for traveling to the destination, or a duration of a remaining portion of the current trip to the destination.

14. The computing device of claim 9, wherein the destination is a destination included in a previous request and wherein to generate the one or more sets of navigation directions, the instructions cause the computing device to:

obtain the one or more sets of navigation directions cached from the previous request.

15. The computing device of claim 9, wherein the request is an audio request and the response to the request is an audio response.

16. The computing device of claim 9, wherein the request is for a duration of a remaining portion of the current trip to a particular destination, and the response includes an indication of the duration of the remaining portion of the current trip to the particular destination based on a most likely route to the particular destination according to the current trajectory and current traffic data on the route.

17. A non-transitory computer-readable medium storing instructions for providing navigation information regarding a current trip by a user without the user having previously initiated a navigation session, that when executed by one or more processors cause the one or more processors to:

receive a request for navigation information regarding a current trip by the user prior to a user initiating the navigation session;

convert, by a language processing module executing on the one or more processors, the request into a transcript, wherein the language processing module is trained by a machine learning model using labeled training sets;

identify, by a language processing module executing on the one or more processors, navigation-specific attributes of the transcript;

detect within the transcript a term related to the current trip;

automatically launch, based on the analysis of the request, a navigation application;

determine by the navigation application a destination for the current trip based on a current trajectory of the user;

generate by the navigation application one or more sets of navigation directions for traveling from a current location of the user to the determined destination of the current trip along one or more routes based on the current trajectory of the user; and provide a response to the request for navigation information based on the generated one or more sets of navigation directions.

18. The non-transitory computer-readable medium of claim 17, wherein the request for navigation information is received prior to launching a navigation application.

19. The non-transitory computer-readable medium of claim 17, wherein the request does not include the destination for the current trip.

20. The non-transitory computer-readable medium of claim 17, wherein to determine the destination for the current trip, the instructions cause the one or more processors to at least one of:

determine the destination for the current trip as a destination included in the request for navigation information;

infer the destination for the current trip based on a destination included in a previous request; or infer the destination for the current trip based on user context data.

\* \* \* \* \*